(12) United States Patent
Wei et al.

(10) Patent No.: US 9,811,557 B2
(45) Date of Patent: Nov. 7, 2017

(54) OPTIMIZING QUERY STATEMENTS IN RELATIONAL DATABASES

(71) Applicant: International Business Machines Corporation, Armonk, NY (US)

(72) Inventors: DongJie Wei, Beijing (CN); Ke W. Wei, Beijing (CN); Xin Ying Yang, Beijing (CN); Miao Zheng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 228 days.

(21) Appl. No.: 14/250,505

(22) Filed: Apr. 11, 2014

(65) Prior Publication Data

US 2014/0358894 A1    Dec. 4, 2014

(30) Foreign Application Priority Data

May 30, 2013  (CN) .......................... 2013 1 0210410

(51) Int. Cl.
*G06F 7/00* (2006.01)
*G06F 17/30* (2006.01)

(52) U.S. Cl.
CPC .. *G06F 17/30442* (2013.01); *G06F 17/30451* (2013.01)

(58) Field of Classification Search
None
See application file for complete search history.

(56) References Cited

U.S. PATENT DOCUMENTS

| | | | |
|---|---|---|---|
| 5,724,568 A * | 3/1998 | Bhargava | G06F 17/30463 |
| 7,434,109 B1 * | 10/2008 | Stabile | H04L 43/04 709/223 |
| 7,668,818 B2 | 2/2010 | Hou et al. | |
| 8,024,321 B2 | 9/2011 | Muras | |
| 8,200,657 B2 | 6/2012 | Purcell et al. | |
| 8,386,450 B2 | 2/2013 | Simmen | |
| 2002/0069193 A1 * | 6/2002 | Beavin | G06F 17/30454 |
| 2003/0018618 A1 * | 1/2003 | Bestgen | G06F 17/30469 |
| 2003/0195881 A1 * | 10/2003 | Koo | G06F 17/30454 |
| 2004/0044662 A1 * | 3/2004 | Ganesan | G06F 17/30439 |
| 2005/0165741 A1 * | 7/2005 | Gordon | G06F 17/30306 |
| 2005/0210023 A1 * | 9/2005 | Barrera | G06F 17/30463 |
| 2007/0112736 A1 * | 5/2007 | Okamoto | G06F 17/3046 |
| 2009/0070313 A1 * | 3/2009 | Beyer | G06F 17/30386 |
| 2009/0171890 A1 * | 7/2009 | Johnson | G06F 17/30516 |

(Continued)

FOREIGN PATENT DOCUMENTS

| | | | | |
|---|---|---|---|---|
| CN | 101093493 A | 12/2007 | | |
| EP | 1577796 A1 * | 9/2005 | ....... | G06F 17/30454 |

*Primary Examiner* — Augustine K Obisesan
(74) *Attorney, Agent, or Firm* — Cantor Colburn LLP (57) ABSTRACT

Optimizing query statements in relational databases including determining filtering performance for each of at least two complex predicates in a predetermined layer of the query statement based on a result of a query performed on predetermined data records by using only the complex predicate. The results are ranked based on the filtering performance and re-ordered so that a complex predicate with a higher filtering performance is ranked before a complex predicate with a lower filtering performance. These techniques produce shortened data query response times and improved execution efficiency.

15 Claims, 5 Drawing Sheets

(56) References Cited

U.S. PATENT DOCUMENTS

| | | | |
|---|---|---|---|
| 2009/0292714 A1* | 11/2009 | Han ................. | G06F 17/30958 |
| 2009/0299989 A1* | 12/2009 | Zhang ............... | G06F 17/30469 |
| 2011/0029508 A1* | 2/2011 | Al-Omari ......... | G06F 17/30433 |
| | | | 707/718 |
| 2011/0040722 A1* | 2/2011 | Moxey ................. | G06Q 10/06 |
| | | | 706/56 |
| 2011/0055197 A1* | 3/2011 | Chavan .............. | G06F 17/3046 |
| | | | 707/713 |
| 2012/0117054 A1 | 5/2012 | Shrinivas et al. | |
| 2012/0130982 A1* | 5/2012 | Kulkarni .......... | G06F 17/30471 |
| | | | 707/713 |

\* cited by examiner

$$\begin{bmatrix} P1 & 1 & 1 & 0 & 0 & 1 & 0 & 0 & 1 & 0 & 1 \\ P2 & 1 & 1 & 0 & 1 & 1 & 0 & 1 & 1 & 0 & 1 \\ P3 & 0 & 0 & 1 & 1 & 1 & 1 & 1 & 0 & 1 & 0 \end{bmatrix} \quad \begin{matrix} \text{the number of elements} \\ \text{having the value 1 which is} \\ \text{considered in re-ordering} \\ 7 \\ 6 \end{matrix} \Rightarrow \text{the order needs not to be reversed}$$

$$\begin{bmatrix} P1 & \boxed{1} & \boxed{1} & 0 & 0 & \boxed{1} & 0 & 0 & \boxed{1} & 0 & \boxed{1} \\ P2 & \boxed{1} & \boxed{1} & 0 & 1 & \boxed{1} & 0 & 1 & \boxed{1} & 0 & \boxed{1} \\ P3 & \boxed{0} & \boxed{0} & 1 & 1 & \boxed{1} & 1 & 1 & \boxed{0} & 1 & \boxed{0} \end{bmatrix} \quad \begin{matrix} \text{the number of elements} \\ \text{having the value 1 which is} \\ \text{considered in re-ordering} \\ 2 \\ 5 \end{matrix} \Rightarrow \text{the order needs to be reversed}$$

OPTIMIZING QUERY STATEMENTS IN RELATIONAL DATABASES

CROSS-REFERENCE TO RELATED APPLICATIONS

This application claims priority to Chinese Patent Application No. 201310210410.4, filed May 30, 2013, and all the benefits accruing therefrom under 35 U.S.C. §119, the contents of which in its entirety are herein incorporated by reference.

BACKGROUND

The present disclosure relates to the field of relational databases and, more specifically, to a method and apparatus for optimizing a query statement in a relational database.

Mainstream relational database programs provide relational database services (RDS). An illustrative RDS process parses database query statements (referred herein as "query statements") and performs query-statement semantic transformation (QST) based on the parsing. In this process, the query statement is also rewritten. The RDS process then performs a selection of access path evaluation based on the query processed by QST and generates access specific language for generating an execution structure by an execution structure generator. The database engine (or the execution module thereof) executes the query based on the execution structure so as to obtain a query result. The process for selecting an optimal access path is an important research subject in the field of database query. Query rewriting is therefore an important part of selecting the optimal access path.

SUMMARY

Embodiment includes a method, apparatus and computer program product for optimizing a query statement in a relational database. Filtering performance is determined for each of at least two complex predicates in a predetermined layer of the query statement based on a result of a query performed on predetermined data records by using only the complex predicates. The complex predicates are re-ordered in the predetermined layer based on the filtering performance so as to rank a complex predicate with a higher filtering performance before a complex predicate with lower filtering performance.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, where the same reference generally refers to the same components in the embodiments of the present disclosure.

DETAILED DESCRIPTION

Embodiments may be realized in a method, apparatus, and computer program product for optimizing query statements in relational databases. The techniques include determining filtering performance for each of at least two complex predicates in a predetermined layer of the query statement based on a result of a query performed on predetermined data records by using only the complex predicate. The results are ranked based on the filtering performance and re-ordered so that a complex predicate with a higher filtering performance is ranked before a complex predicate with a lower filtering performance. These techniques produce shortened data query response times and improved execution efficiency.

Nowadays, mainstream relational database programs provide relational database services (RDS). An illustrative RDS process parses database query statements (referred to as query statements below for short) and performs query-statement semantic transformation (QST) based on the parsing. In this process, the query statement is also rewritten. The RDS process then performs a selection of access paths evaluation based on the query processed by QST and generates access specific language for generating an execution structure by an execution structure generator. The database engine (or the execution module thereof) will execute the query based on the execution structure so as to obtain a query result.

The process for selecting an optimal access path to perform query is an important research subject in the field of database query. Query rewriting is therefore an important part of selecting the optimal access path. During the query rewriting, the applicable RDS process transforms the query statement into a form that can be executed more efficiently. There are some known query rewriting techniques for simple predicates, such as predicate re-distributing, predicate re-ordering, and the like. In the present field, the predicate may sequentially include an argument with no function, expression or clause, an operation relational operator or logical operator, a connection constant is referred to as a simple predicate, whereas predicates of other types are referred to as complex predicates, which for example may include arguments, functions, expressions, sub-clauses, or the like. In the database language, the relational operators or logical operators can include "=", ">", ">=", "<", "<=", "NOT", "IN", "LIKE", "BETWEEN", or the like.

The predicate are re-ordered as described above, a filter factor for the simple predicate is usually estimated based on database statistical information and the predicate with high filtering performance is applied as early as possible in the query so as to improve the query efficiency. However, the database statistical information is often rough and general and cannot reflect the data information exactly in real time. Therefore, the filter factor for the simple predicate calculated based on the database statistical information is usually not accurate enough, causing that the ordering of the predicates thus determined to be less than optimal. On the other hand, since the complex predicates are not processed by the data manager (DM) but executed on the relational data server, the filter factor for the complex predicate cannot be estimated in advance based on the database statistical information, and thus the predicate re-ordering technique described above cannot be used for the complex predicates.

Illustrative embodiments will be described in more detail with reference to the accompanying drawings. It will be understood by skilled programmers that the techniques described in the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In view of the problems as described above, a method and apparatus for optimizing query statements in a relational databases is capable of reducing the required response time and improving execution efficiency of a database query. The optimizing method and apparatus can be applied to complex predicates, and thus enlarge the applicable scope of the query rewriting technique.

According to one embodiment of the present disclosure, a method for optimizing a query statement in a relational database includes determining filtering performance for each of at least two complex predicates in a predetermined layer of the query statement based on a result of a query performed on predetermined data records by using only the complex predicate. The complex predicates are then re-ordered in the predetermined layer based on the filtering performance so as to rank a complex predicate with higher filtering performance before a complex predicate with lower filtering performance. For example, the filtering performance based on least two complex predicates in a predetermined layer of the query statement may be based on a result of query performed on predetermined data records by using only the complex predicate. The complex predicates are then ranked and re-ordered so that a complex predicate with higher filtering performance is ranked before a complex predicate with lower filtering performance.

The method and apparatus according to the above aspects of the present disclosure can precisely determine the filtering performance for a complex predicate by querying the data records to be queried using only the complex predicate. High execution efficiency can be obtained by re-ordering the predicates based on the filtering performance thus precisely determined. In addition, the method and apparatus according to the above aspects of the present disclosure can be applied to a query containing both simple predicates and complex predicates, and thus have a relatively broad applicable scope.

Additional aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus that implements the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
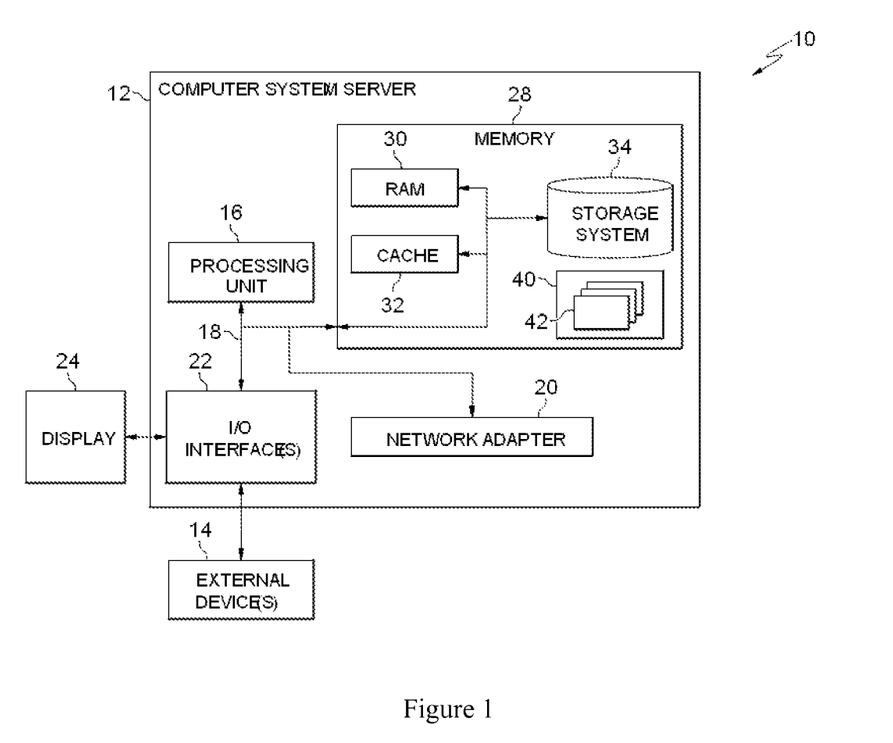
FIG. 1 shows a block diagram of an exemplary computer system/server 12 which is applicable to implement the embodiments of the present disclosure.

Referring now to FIG. 1, in which a block diagram of an exemplary computer system/server 12 which is applicable to implement the embodiments of the present disclosure is shown. The computer system/server 12 shown in FIG. 1 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

First Embodiment

Figure 2:
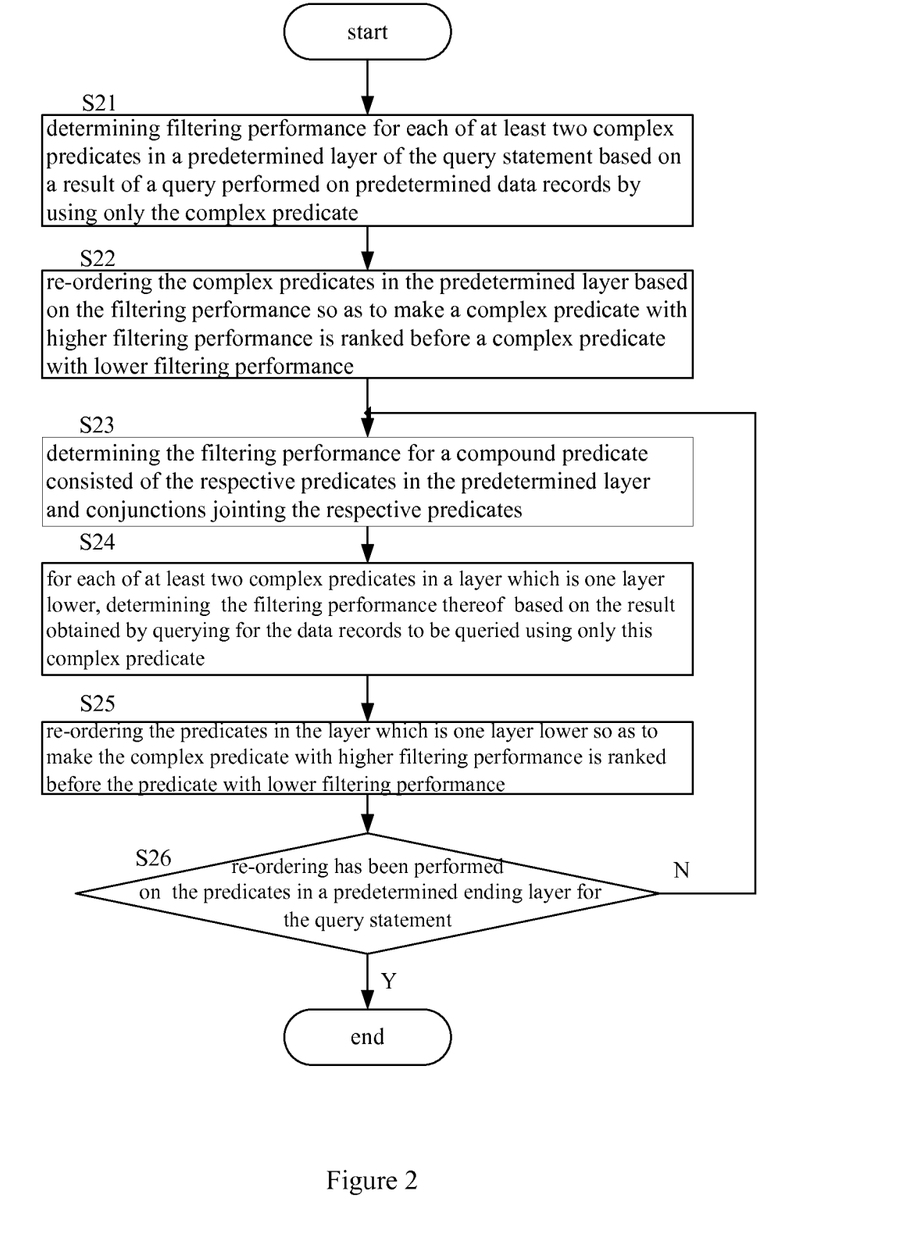
FIG. 2 shows a flow chart of an optimizing method for the query statement in the relational database according to an embodiment of present disclosure.

FIG. 2 shows an optimizing method for a query statement in a relational database according to an embodiment of the present disclosure.

As shown in FIG. 2, at step S21, filtering performance is determined for each of at least two complex predicates in a predetermined layer of the query statement based on a result of a query performed on predetermined data records by using only the complex predicate.

First, the technical terms involved in the present embodiment will be explained briefly.

Taking the Structured Query Language as an example, a predicate is located after "Where" instruction in a query statement and used to construct conditions to filter out the records of all the data records which satisfy the conditions. As described above, a predicate sequentially comprising an argument with no function, expression or clause, an operation relational operator or logical operator, a connection constant is referred to as a simple predicate. The examples of the simple predicate can include but is not limited to COL op value, COL IS NULL, COL IS NOT NULL, COL BETWEEN value1 AND value2, COL <> value, COL NOT BETWEEN value1 AND value2 or the like, where op represents "=", ">", ">=", "<", "<=", and value, value1 and value2 are constant. The simple predicate is also called Stage1 predicate which is executed by Data Manager (DM) in Relational Database Managing System (RDBMS) when the query statement is run. The predicates other than the simple predicate are referred to as complex predicates such as COL1 op COL2+value, T1.COL1 op T2.COL2 or the like. The complex predicate is also called Stage2 predicate which is executed by a relational data server in RDBMS when the query statement is run.

The filtering performance of the predicate is used for reflecting the capability of the predicate for filtering out the records satisfying the conditions, and can be represented by various appropriate parameters and variables. For example, a filter factor is a commonly used parameter for representing the filtering performance. The filter factor for the predicate is a number between 0 and 1 and is used for estimating a proportion of the records for which the predicate is true to all the data records. As mentioned hereinbefore, in the prior art, the filter factor for the simple predicate is generally estimated based on the rough, general database statistical information and thus usually is not accurate enough.

The process in this step will be described in detail below by taking a particular predicate expression as an example. For example, assuming an exemplary query statement is as following:

SELECT*

FROM T1

WHERE P1 AND (P2 OR (P3 AND P4 OR P5)), where P1, P2, P3, P4 and P5 are complex predicates. (1)

According to the rules of the executing order of the query statements, it can be seen by analyzing this predicates expression that P3 and P4 are predicates of the highest layer (the 4th layer), that is, the predicates to be executed first when the query statement is run; P5 is the predicate of the third layer, that is, the predicate to be executed after the executions of P3 and P4 are completed; and P2 and P1 are the predicates of the second layer and the first layer, respectively. The process in step 21 will be described below with reference to an example in which a predetermined layer is the highest layer.

Firstly, sequence numbers of data records resulted from the query performed by using only the predicate P3 and by using only the predicate P4 are determined.

From expression (1), we can see that the query statement will query for the data records in the table T1. For the convenience of explanation, it is assumed there are only eight data records in the table T1. That is, eight records from record 1 to record 8 will be retrieved in the query for the data records without any predicate (SELECT*FROM T1). It is assumed that all the data records are retrieved in the query for the data records with only the predicate P3 (SELECT*FROM T1 WHERE P3), whereas record 1, record 2, record 7 and record 8 are retrieved in the query for the data records with only the predicate P4(SELECT*FROM T1 WHERE P4).

Next, row vectors of N-variables corresponding to predicates P3 and P4 are created, respectively, for representing the filtering performance of P3 and P4, where N is a number of data records retrieved in the query for the data records without any predicate (i.e., all the data records in the table T1), and in the row vectors, the elements at the positions corresponding to the sequence numbers of the retrieved data records are of 1 and the elements at other positions are of 0. Consequently, the following row vectors of N-variables corresponding to P3 and P4, respectively, are obtained:

P3 [1 1 1 1 1 1 1 1]

P4 [1 1 0 0 0 0 1 1] (2)

In present example, the filtering performance of the predicate is represented by the result of the query actually performed on the data records to be queried using only said complex predicate, and thus is very accurate.

Subsequently, at step S22, the complex predicates in the predetermined layer are re-ordered based on the filtering performance so as to make the complex predicate with higher filtering performance is ranked before the complex predicate with lower filtering performance.

Predicate conjunction is a logical operator for performing a logical operation on the two predicates joined by it, including AND OR. It is understood that in the case that the predicate conjunction is AND, as for the two predicates joined by this conjunction, the one for which less data records can be filtered out (retrieved by the query) when running the query statement should be arranged ahead so as to reduce the number of the data records to be processed by the behind predicate, thereby reducing the overall estimations and checks for the predicates. For example, it is assumed that there are a thousand of records in the table MAN TABLE and the exemplary query statement is SELECT*FROM MAIN_TABLE WHERE Predicate 1 and Predicate 2; 800 of the total number of the records can be filtered out with Predicate 1, and 100 of the total number of the records can be filtered out with Predicate 2. In accordance with the current order of the predicates, when executing the query statement, every records in the table should be determined whether it satisfies Predicate1 1, that is, Predicate 1 is estimated and checked for 1000 times. Since the predicate conjunction in that query statement is AND, the records to be retrieved out by this query statement are those which respectively satisfy Predicate 1 and Predicate 2 simultaneity, and after that, it is determined for every of the 800 records filtered out by Predicate 1 whether it satisfies Predicate 2, that is, Predicate 2 is estimated and checked for 800 times. Therefore, there are 1800 times of the predicate estimations and checks in total. However, if the order of the predicates is reversed, that is, Predicate 2 is placed ahead of the predicate conjunction AND, Predicate 2 will be estimated and checked for 1000 times, but Predicate 1 will be estimated and checked for only 100 times. Therefore, there will be 1100 times of the predicate estimations and checks in total. On the contrary, in the case that the predicate conjunction is OR, as for the two predicates joined by it, the one for which more data records can be filtered out (retrieved by the query) when running the query statement should be placed ahead so as to retrieve as more data as possible at first.

In the present disclosure, in the case that the predicate conjunction is AND, the predicate for which less data records can be filtered out is referred to as predicate with high filtering performance, and on the contrary, in the case that the predicate conjunction is OR, the predicate for which more data records can be filtered out is referred to as predicate with high filtering performance.

Figure 3:
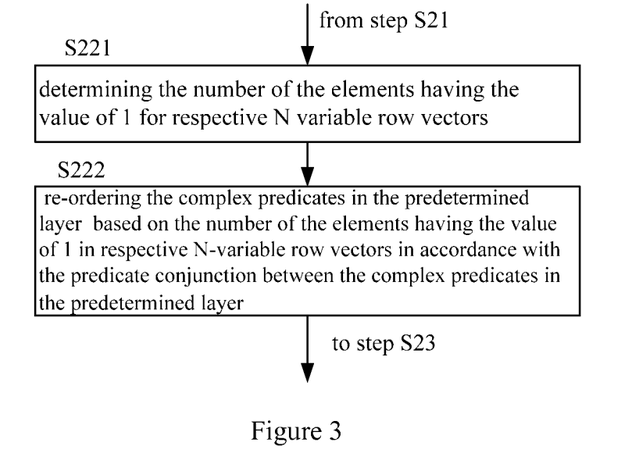
FIG. 3 shows a flow chart for a re-ordering process of the complex predicates in the relational database according to an embodiment of present disclosure.

FIG. 3 shows an exemplary process of step S22. The process of step S22 will be described in detail below with reference to FIG. 3.

At step S221, the number of the elements having a value of 1 is determined for respective N-variable row vectors.

As for P3 and P4 in the highest layer in the above example, it can be seen from expression (2) that the number of the elements having the value of 1 is 8 in the N-variable row vector corresponding to P3, and the number of the elements having the value of 1 is 4 in the N-variable row vector corresponding to P4. It can be understood that more elements have the value of 1 in a N-variable row vector, more data records is filtered out for the predicate corresponding to said N-variable row vector.

Subsequently, at step S222, the complex predicates in a predetermined layer will be re-ordered based on the number of the elements having the value of 1 in respective N-variable row vectors in accordance with the predicate conjunction between the complex predicates in the predetermined layer. In specific, in the case where the predicate conjunction is AND, the complex predicate corresponding to the N-variable row vector with less elements having the value of 1 is disposed ahead of the complex predicate corresponding to the N-variable row vector with more elements having the value of 1; and in the case where the predicate conjunction is OR, the complex predicate corresponding to the N-variable row vector with more elements having the value of 1 is disposed ahead of the complex predicate corresponding to the N-variable row vector with less elements having the value of 1.

The predicate conjunction between P3 and P4 is AND, and from the analysis above, the predicate with higher filtering performance, that is, the one for which less data records may be filtered out when miming the query statement should be placed ahead. As a result, the order of P3 and P4 is reversed so that P4 is placed ahead of P3.

Hereto, the predicates P3 and P4 in the highest layer are re-ordered. It should be noted that although P1 to P5 in the above example are all complex predicates, the processing steps described above can also be applied to the predicate expression containing simple predicates. For example, it is assumed that the predicate expression is P1 AND (P2 OR (P3 OR P4 OR P5)) where P1, P2, P4 and P5 are complex predicates and P3 is a simple predicate. In this case, when re-ordering is performed for the highest layer P3 OR P4 OR P5, the steps S21 and S22 as described above can also be used to compare the filtering performance and adjust the order with respect to only the complex predicates P4 and P5, and no process will be performed on P3.

In addition, there are only two complex predicates P3 and P4 contained in the highest layer in the above example, but actually there may be more than two predicates in the highest layer or other layers. In this case, the processing steps as described above can also be applied. For example, it is assumed that the predicate expression is P1 AND (P2 OR (P3 AND P4 AND P5)) where P3, P4 and P5 are complex predicates. In this case, when re-ordering is performed for the highest layer P3 AND P4 AND P5, the steps S21 and S22 as described above can also be used to compare the filtering performance of the three complex predicates P3, P4 and P5, and adjust the order thereof accordingly. In another aspect, for those skilled in the art, when using the method according to the embodiment of the present disclosure, re-ordering of predicates can be performed on only a portion of the complex predicates in the predetermined layer as required. For example, as for the above predicate expression P1 AND (P2 OR (P3 AND P4 AND P5)), although there are three complex predicates in the highest layer, in order to avoid from consuming too much time for re-ordering, or if the user concerns for example only the optimization of predicates P3 and P4, the re-ordering can be performed on only the predicates P3 and P4 in the highest layer, that is, P5 will not be taken into account in the re-ordering.

Returning to FIG. 2, other predicates in the predicate expression may be further re-ordered in the following steps S23-S26.

As shown in FIG. 2, at step S23, the filtering performance is determined for a compound predicate consisting of the respective predicates in the layer for which the re-ordering is performed and the predicate conjunction joining the respective predicates.

Since the compound predicate consisting of the respective predicates in the layer for which the re-ordering in step S22 is currently performed and the predicate conjunction joining the respective predicates may also be involved in the subsequent re-ordering, the filtering performance for this compound predicate is required to be determined.

In specific, in this step, with respect to the respective N-variable row vectors corresponding to the respective predicates in the layer for which the re-ordering is performed currently, a logical operation represented by this predicate conjunction is performed one element by one element so that an intermediate N-variable row vector corresponding to said compound predicate is obtained.

Figure 4:
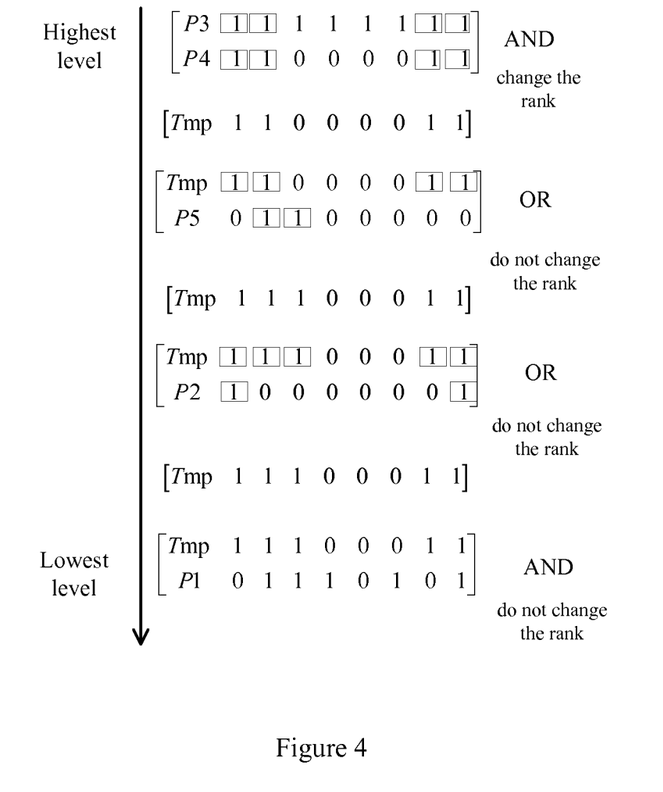
FIG. 4 shows an exemplary process in which the complex predicates are re-ordered by using the optimizing method according to a first embodiment of the present disclosure.

As for P3 and P4 in the highest level in the above example, as shown in FIG. 4, the N-variable row vectors corresponding to P3 and P4, respectively, are aligned and a AND operation is performed on the elements in the corresponding positions in the row vectors one element by one element, and the intermediate N-variable row vector TMP [1 1 0 0 0 0 1 1] is thus obtained which is used for representing the filtering performance of the compound predicate (P3 AND P4).

It is to be noted, at this step, the logical operation represented by the predicate conjunction is performed on all the N-variable row vectors of all the predicates in the layer for which the re-ordering is performed currently rather than just on those predicates the ranks of which have been adjusted actually. For example, for the predicate expression P1 AND (P2 OR (P3 AND P4 AND P5)) where P1, P2, P4 and P5 are complex predicates and P3 is a simple predicate, according to the present embodiment, in the preceding step, the determination of the filtering performance and the re-ordering are required only for the complex predicates P4 and P5, and no operation is required for P3. Consequently, a N-variable row vector corresponding to P3 is created at first (referring to the description in step S21 for the detailed operation, the repetitive description is omitted here) and then the AND operation is performed on the three N-variable row vectors corresponding to P3, P4 and P5 respectively, one element by one element, thereby obtaining the intermediate N-variable row vector representing the filtering performance of the complex predicate (P3 AND P4 AND P5).

At step S24, for each of at least two complex predicates in a layer which is one layer lower than the layer for which the re-ordering is currently performed, the filtering performance is determined based on the result obtained by querying for the data records to be queried using only this complex predicate.

At step S25, the predicates in the layer which is one layer lower are re-ordered so as to make the complex predicate with higher filtering performance is ranked before the predicate with lower filtering performance.

With steps S24 and S25, the predicates in the layer which is one level lower than the layer for which the re-ordering in step S22 is currently performed are re-ordered. The operations in steps S24 and S25 are substantially the same as those in steps S21 and S22, respectively, details omitted here, and only a brief description will be given by using the exemplary predicate expression P1 AND (P2 OR (P3 AND P4 OR P5)) in which P1 to P5 are all complex predicates as described above.

As described before, as for this exemplary predicate expression, P3 and P4 are the predicates in the highest layer (the 4th layer), and P5 is a predicate in the third layer. Furthermore, compound predicate (P3 AND P4) is also in the third layer, and can be considered as a complex predicate. The process of re-ordering is thus performed on compound predicate (P3 AND P4) and predicate P5 at this time.

It is assumed that record 2 and record 3 are obtained when the data record query is performed with only predicate P5 (SELECT*FROM T1 WHERE P5). Accordingly, a N-variable row vector can be created for predicate P5: P5 [0 1 1 0 0 0 0 0]. As shown in FIG. 4, the number of elements having the value of 1 in the N-variable row vector corresponding to the compound predicate (P3 AND P4) is 4, and the number of elements having the value of 1 in the N-variable row vector corresponding to P5 is 2. Since the predicate conjunction between (P3 AND P4) and P5 is OR, from the above analysis, the predicate with higher filtering performance, that is, the predicates for which more data records can be filtered out when running the query statement should be placed ahead, and thus the order of (P3 AND P4) and P5 does not need a change.

Subsequently, at step S26, it is determined whether the re-ordering is performed on the predicates in a predetermined ending layer for the query statement. If the result of this determination is "YES", the optimizing method according to the present embodiment completes; otherwise if the result is "NO", it returns to step S23.

For example, as for the exemplary predicate expression P1 AND (P2 OR (P3 AND P4 OR P5)) in which P1 to P5 are all complex predicates as described above, it is assumed that the predetermined ending layer is the lowest layer, that is, the first layer, then the result of the determination in step S26 is NO here, and thus the process returns to step S23. A brief description will be given below for the subsequent processing steps when applying the optimizing method of present embodiment to this exemplary predicate expression in connection with FIG. 4.

FIG. 4 shows an example process in which a re-ordering process is performed on the predicates by using the optimizing method according to the present embodiment. It is assumed that record 1 and record 8 are retrieved in the query for the data records with only the predicate P2 (SELECT*FROM T1 WHERE P2); and record 2, record 3, record 4, record 6 and record 8 are retrieved in the query for the data records with only the predicate P1 (SELECT*FROM T1 WHERE P1). In this case, the N-variable row vectors corresponding to P2 and P1 are respectively P2 [1 0 0 0 0 0 0 1] and P1 [0 1 1 1 0 1 0 1]. As shown in FIG. 4, after the re-ordering process performed on the predicates in the third layer, the N-variable row vector for compound predicate P3 AND P4 OR P5 is determined as TMP [1 1 1 0 0 0 1 1] in which the number of the elements having the value of 1 is 5, and the number of the elements having the value of 1 in the N-variable row vector corresponding to P2 is 2. Since the predicate conjunction between P2 and (P3 AND P4) OR P5 is OR, the order of P2 and (P3 AND P4) OR P5 does not need to be changed. Hereto, the re-ordering process is performed on the predicates from the fourth layer to the second layer. Since the predetermined ending layer is the first layer, the determination result at step S26 is NO here, and thus the process returns to step S23 again. At this time, the N-variable row vector for compound predicate P2 OR (P3 AND P4 OR P5) is determined as TMP [1 1 1 0 0 0 1 1] in which the number of the elements having the value of 1 is 5, whereas the number of the elements having the value of 1 in the N-variable row vector corresponding to P1 is also 5. The order of P1 and P2 OR (P3 AND P4 OR P5) thus does not need to be changed. Thus, the re-ordering process is performed on the predicates from the fourth layer to the first layer. At this time, the determination result in step S26 is "YES", and the process of performing the optimizing method according to the present embodiment on the respective predicates in the entire predicate expression completes.

The method for optimizing the query statement in the relational database according to one embodiment of present disclosure has been described hereinbefore. In this embodiment, filtering performance of a predicate is represented by a row vector representing precisely the actual query result obtained through a query for the data records to be queried with the predicate only, and the predicates are re-ordered based on the precise filtering performance. The filtering performance is of high granularity and high accuracy, and the re-ordering based on this filtering performance takes the actual data into account and thus is reliable and precise. Consequently, high execution efficiency may be obtained when executing the query statement by using the optimizing method according to the present embodiment.

It is to be noted that although the process of re-ordering the predicates in the entire predicate expression from the predicate in the highest layer to the predicate in the lowest layer of the query statement has been described above, this is not necessary. To be specific, when implementing the method according to the embodiment described above, those skilled in the art may apply the predicate re-ordering to only the predicates in one or more predetermined layers according to their specific requirement. For example, in order to avoid from consuming too much time for the re-ordering process, or if for example, only the optimization of predicates P3 and P4 in the query is concerned, the re-ordering can be performed on only the predicates P3 and P4 in the highest layer. Therefore, the steps S23 to S26 in the above embodiment are not necessary.

Second Embodiment

According to the above embodiment, the simple predicates are not taken into account in re-ordering the complex predicates, that is, not involved in the re-ordering process. In fact, however, the presence of the simple predicates may affect the re-ordering of the complex predicates. In present embodiment, the simple predicates will be considered in re-ordering the complex predicates to obtain a more precise rank so that the query statement can be executed with higher efficiency.

The optimizing method according to the present embodiment is substantially the same as that in the first embodiment except the process in step S221. In specific, in the optimizing method according to the present embodiment, in the case where there is at least one simple predicate in the predetermined layer, at step S221, a N-variable row vector is created for each of the simple predicates; subsequently, when the predicate conjunction is AND, for each N-variable row vector corresponding to the complex predicate, the number of the elements in this row vector which have the value of 1 besides the elements at the positions corresponding to the elements having the value of 0 in the N-variable row vector corresponding to the simple predicate is determined as the number of the elements having the value of 1 in this N-variable row vector; and when the predicate conjunction is OR, the number of the elements in this row vector which have the value of 1 besides the elements at the positions corresponding to the elements having the value of 1 in the N-variable row vector corresponding to the simple predicate is determined as the number of the elements having the value of 1 in this N-variable row vector.

It is assumed that the predicate expression in the layer for which the re-ordering is currently performed is P1 OR P2 OR P3 where P1 is a simple predicate and P2 and P3 are complex predicates, and the N-variable row vector corresponding to predicates P2 and P3 have been determined as following through step S21:

P2 [1 1 0 1 1 0 1 1 0 1]

P3 [0 0 1 1 1 1 1 0 1 0]          (3)

Figure 5:
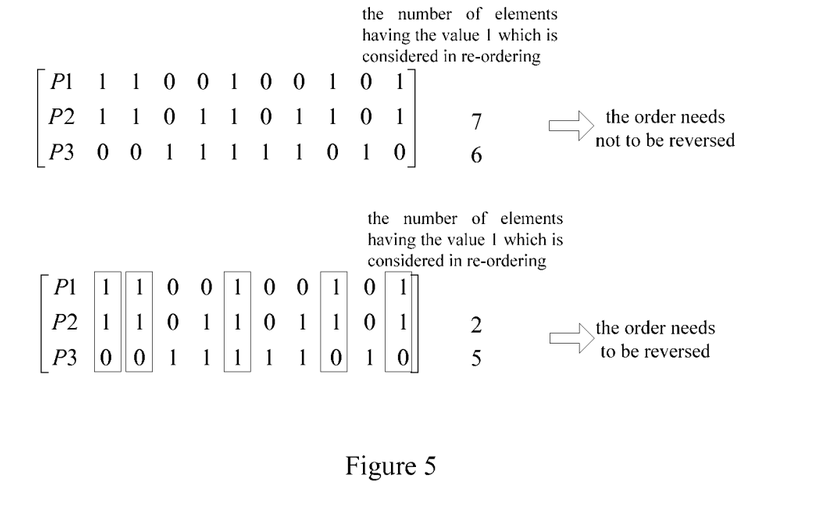
FIG. 5 shows an exemplary process in which the complex predicates are re-ordered by using the optimizing method according to a second embodiment of the present disclosure.

The exemplary process of performing the re-ordering on the exemplary predicates by using the optimizing method according to the present embodiment will be described below with reference to FIG. 5.

The N-variable row vector corresponding to the simple predicate P1 is determined at first. It is assumed that record 1, record 2, record 5, record 8 and record 10 are obtained in the query for the data records with only the predicate P1, and thus the corresponding N-variable row vector can be determined as P1 [1 1 0 0 1 0 0 1 0 1]. As shown in FIG. 5, if P2 and P3 are re-ordered without considering the filtering performance of P1 (that is, processed in accordance with step 21 in the first embodiment), it can be determined that the number of the elements having the value of 1 in the N-variable row vector corresponding to P2 is 7, and the number of the elements having the value of 1 in the N-variable row vector corresponding to P2 is 6. Since the predicate conjunction between P2 and P3 is OR, the order of P2 and P3 will be reversed in the following step S22. However, when the query statement is executed actually, the simple predicate is executed in the data manager layer and will not wait for the execution in the relational data server as the complex predicates do. As a result, with regard to the predicate expression as described above for example, the query result for P1 has, in fact, already been known when executing P2 and P3. To be specific, as shown in FIG. 5, since record 1, record 2, record 5, record 8 and record 10 will be filtered out when executing P1, and the predicate conjunction between P1, P2 and P3 is OR, it is already known that record 1, record 2, record 5, record 8 and record 10 satisfy the predicate expression P1 OR P2 OR P3 when executing P2 and P3. Thus as for P2 and P3, it makes more sense to compare the filtering performance thereof with respect to the data records which have not been filtered out through P1, and the rank determined based on this filtering performance will be more accurate. Therefore in step S221, for the N-variable row vector corresponding to P2, it is determined that the number of the elements in this row vector having the value of 1 besides the elements at the positions corresponding to the elements having the value of 1 in the N-variable row vector corresponding to P1 (i.e., the positions 1, 2, 5, 8, and 10) is 2, and for the N-variable row vector corresponding to P3, it is determined that the number of the elements in this row vector having the value of 1 besides the elements at the positions corresponding to the elements having the value of 1 in the N-variable row vector corresponding to P1 is 5. In the following step S222, it is determined whether to reverse the order of P2 and P3 based on this number of elements.

It should be noted that those skilled in the art may understand the filtering performance of P2 and P3 should be compared with respect to the data records already filtered out by P1 for the predicate expression with the AND predicate conjunction, for example, P1 AND P2 AND P3 (where P1 is a simple predicate and P2 and P3 are complex predicates). That is, for any one of the N-variable row vectors corresponding to P2 and P3, respectively, the number of the elements having the value of 1 in this row vector besides the elements at the positions corresponding to the elements having the value of 0 in the variable row vector corresponding to P1 (i.e., positions 3, 4, 6, 7, 9) should be determined.

Third Embodiment

In the first and second embodiments described above, the filtering performance of the predicate is represented by using the row vector of high granularity and high accuracy. When the number of the data records is very large, however, a large amount of storage space is required to store the row vectors corresponding to the respective predicates, and the amount of calculation for determining whether to change the existing order of the predicates based on the row vectors is also large. In present embodiment, an optimizing method is proposed, which has a relatively low granularity and accuracy but requires less storage space and less amount of calculation, and thus has higher execution efficiency.

The optimizing method according to this embodiment is substantially the same as that in the first embodiment except that in present embodiment the filtering performance of the predicate is represented by using a filter factor of the predicate. The optimizing method according to this embodiment will be described below with reference to FIG. 2. Thereinafter, only the different parts of the optimizing method according to this embodiment from those in the first embodiment will be described and the same part will not be described in detail to avoid repetition.

At step S21, filtering performance is determined for each of at least two of the complex predicates in a predetermined layer in the query statement based on a result of a query performed on predetermined data records by using only the complex predicate.

In this step, first, for each of the two complex predicates, only the number of the data records retrieved by using the complex predicate is determined.

For example, taking still the query statement shown in expression (1) as an example. For the predicates in the highest layer for example, it is assumed as before that all of the 8 records are retrieved in the query for the data records with only the predicate P3, whereas four records (record 1, record 2, record 7 and record 8) are retrieved in the query for the data records with only the predicate P4.

Subsequently, the filter factor for the complex predicate is calculated based on the number of the data records retrieved in the query. A filter factor of 8/8=1 is calculated for P3 and a filter factor of 4/8=0.5 is calculated for P4.

At step S22, the complex predicates in the predetermined layer are re-ordered based on the filtering performance so as to make the complex predicate with higher filtering performance is ranked before the complex predicate with lower filtering performance.

In specific, in the case where the predicate conjunction in this layer is AND, the complex predicate with a filter factor of a smaller value is ranked before the complex predicate with a filter factor of a larger value, and in the case where the predicate conjunction in this layer is OR, the complex predicate with the filter factor of the larger value is ranked before the complex predicate with the filter factor of the smaller value.

As for P3 and P4 in the highest layer in the above example, since the predicate conjunction therebetween is AND the filter factor of P3 is larger than that of P4, the order of P3 and P4 is reversed so that P4 is ranked before of P3.

As such, the predicates P3 and P4 in the highest layer are re-ordered. Subsequently, other predicates in the predicate expression may be further re-ordered through steps S23-S26 of the optimizing method according to the present embodiment.

As shown in FIG. 2, at step S23, the filtering performance is determined for a compound predicate consisting of the respective predicates in the layer for which the re-ordering is performed and the predicate conjunction joining the respective predicates.

Herein, the filtering performance is determined by using a conventional method in the art. In specific, in the case that the predicate conjunction is AND, the filter factor for the predicates in the layer for which the re-ordering is currently performed are multiplied with each other to obtain the product as the filter factor for the compound predicate; and in the case that the predicate conjunction is OR, the filter factors for the predicates in the layer for which the re-ordering is currently performed are added together to obtain a sum thereof as the filter factor for the compound predicate.

As for P3 and P4 of the highest layer in the example described above, the filter factor for the compound predicate (P3 AND P4) is 1×0.5=0.5.

It is to be noted, the filter factors for all the predicates in the layer for which the re-ordering is performed currently rather than only the predicates the positions of which have been actually adjusted, are multiplied or added, as in the first embodiment.

At step S24, for each of at least two complex predicates in a layer which is one level lower than the one for which the re-ordering is currently performed, the filtering performance is determined based on the result obtained by querying for the data records to be queried by using this complex predicate.

At step S25, the predicates in the layer which is one level lower are re-ordered based on the filtering performance so as to make the complex predicate with higher filtering performance is ranked before the complex predicate with lower filtering performance.

With steps S24 and S25, the predicates in the layer which is one level lower than the layer for which the re-ordering in step S22 is currently performed are re-ordered. The operations in steps S24 and S25 are substantially the same as those in steps S21 and S22, respectively, details omitted here, and only a brief description will be given by using the exemplary predicate expression P1 AND (P2 OR (P3 AND P4 OR P5)) in which P1 to P5 are all complex predicates as described above.

As described above, as for this exemplary predicate expression, P3 and P4 are the predicates in the highest layer (the 4th layer), and P5 is a predicate in the third layer. In addition, the compound predicate (P3 AND P4) is also in the third layer, and can be considered as a complex predicate. Accordingly, the re-ordering process is performed on compound predicate (P3 AND P4) and predicate P5 at this time.

It is assumed as before that two records (record 2 and record 3) are obtained in the query for the data records by using only the predicate P 5. The filter factor for predicate P5 is thus calculated as 2/8=0.25. Since the filter factor for the compound predicate (P3 AND P4) is 0.5 and the predicate conjunction between (P3 AND P4) and P5 is OR, the order of (P3 AND P4) and P5 does not need to be changed.

Subsequently, it is determined whether the re-ordering is performed on the predicates in a predetermined ending layer of the query statement in step S26. If the result of this determination is "YES", the optimizing method according to the present embodiment completes; and if the result is "NO", it returns back to step S23.

For example, as for the exemplary predicate expression P1 AND (P2 OR (P3 AND P4 OR P5)) as described above, it is assumed that the predetermined ending layer is the lowest layer, i.e., the first layer. The result of determination in step S26 is NO here, and the process returns back to step S23. A brief description will be given below for the subsequent processing steps when applying the optimizing method according to the present embodiment to this exemplary predicate expression.

It is assumed that two records (record 1 and record 8) are retrieved through the query for the data records with only the predicate P2. Thus the filter factor for predicate P2 can be determined as 2/8=0.25, and the filter factor for the compound predicate P3 AND P4 OR P5 is 0.5+0.25=0.75. Since the predicate conjunction between P2 and (P3 AND P4) OR P5 is OR, the order of P2 and (P3 AND P4) OR P5 needs not to be changed. Hereto, the re-ordering process is performed on the predicates from the fourth layer to the second layer. Since the predetermined ending layer is the first layer, the determination result in step S26 is NO here, and thus the process returns back to step 23 again. It is assumed that five records (records 2, 3, 4, 6 and 8) are obtained in the query for the data records by using only the predicate P1. Thus the filter factor for predicate P1 can be determined as 5/8=0.625, and the filter factor for the compound predicate P2 OR (P3 AND P4 OR P5) is 0.75+0.25=1. Since the predicate conjunction between P1 and P2 OR (P3 AND P4 OR P5) is AND, the order of P1 and P2 OR (P3 AND P4 OR P5) is reversed. Hereto, the re-ordering process is performed on the predicates from the fourth layer to the first layer. At this time, the determination result in step S26 is "YES", and the process of performing the optimizing method according to the present embodiment on the respective predicates in the entire predicate expression completes.

It is to be noted that, similar to the first embodiment, those skilled in the art may apply the predicate re-ordering to only the predicates in one or more predetermined layers according to their specific requirement when implementing the method according to the embodiment. For example, in order to avoid from consuming too much time for the re-ordering process, or if for example, only the optimization of predicates P3 and P4 in the query is concerned, the re-ordering can be performed on only the predicates P3 and P4 in the highest layer. Therefore, the steps S23 to S26 in the above embodiment are not necessary.

It can be seen that the rank determined by applying the optimizing method according to the present embodiment to the predicate expression represented in expression (1) is different from that determined by applying the method according to the first embodiment. Although the granularity and the precision of the filtering performance determined according to this embodiment are lower compared with the first embodiment, and thus the re-ordering performed on the predicates based on this filtering performance may not be as precise as that in the first embodiment, the present embodiment does not need not to store a large amount of vectors and thus the storage space is saved and the calculation workload for determining whether the current order of the predicates needs to be changed based on the filter factor is greatly reduced. In another aspect, instead of estimating the filter factors for the simple predicates according to the statistic information in the prior art, in present embodiment, the filter factors are calculated from the actual result of the query for the data records by using the respective predicates. Therefore, the filter factors calculated in the present embodiment are much more precise than those in the prior art.

The structural block diagram of an apparatus for optimizing a query statement in a relational database according to an embodiment of the present disclosure is described below with reference to FIG. 6. The apparatus can perform the methods according to the respective embodiments described above.

Figure 6:
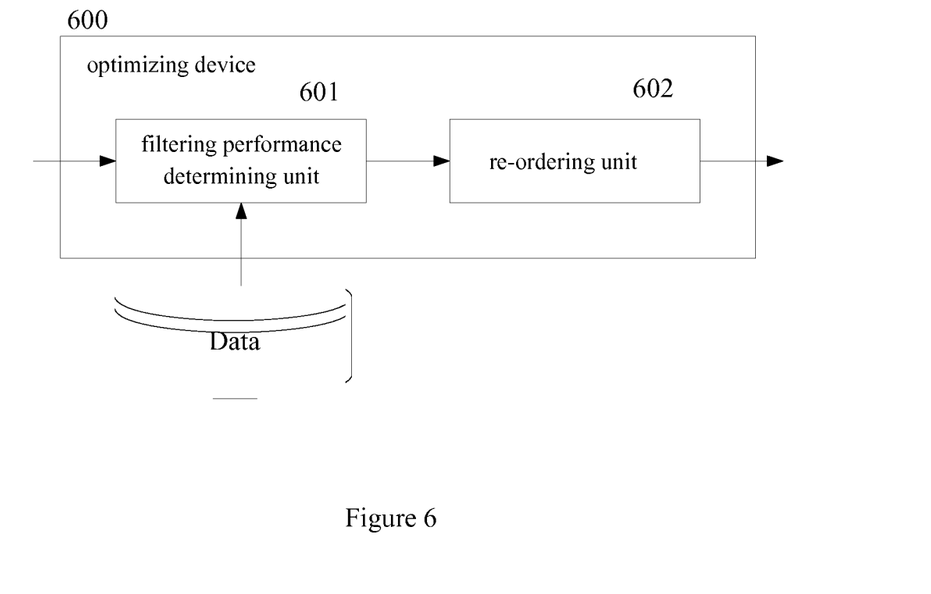
FIG. 6 illustrates a block diagram of the structure of the optimizing apparatus for the query statement in the relational database according to an embodiment of the present disclosure.

As shown in FIG. 6, the optimizing apparatus 600 according to the present embodiment includes a filtering performance determining unit 601 and a re-ordering unit 602. The optimizing apparatus can be implemented inside an optimizer of the database or as an external device independent from the optimizer.

The filtering performance determining unit 601 determines filtering performance for each of at least two complex predicates in a predetermined layer in the query statement based on a result of the query performed on predetermined data record by using only the complex predicate. The re-ordering unit 602 re-orders the complex predicates in the predetermined layer based on the filtering performance so as to make the complex predicate with higher filtering performance is ranked before the one with lower filtering performance. In this re-ordering process, the re-ordering unit 602 performs a rank adjustment on only the complex predicates for which the filtering performance has been determined (that is, the complex predicates that the user concerns) and does not concern the rank of the predicates for which the filtering performance are not determined The filtering performance of the predicate is used for reflecting the capability of the predicate for filtering out the records satisfying the conditions, and can be represented by various appropriate parameters and variables. Depending on the particular parameters or variables used for representing the filtering performance, the filtering performance determining unit 601 and the re-ordering unit 602 may adopt different structures or perform different functions. The filtering performance determining unit 601 and the re-ordering unit 602 will be described in detail below, where the filtering performance of the predicate is represented, for example, by using the row vector representing the actual query result.

Figure 7:
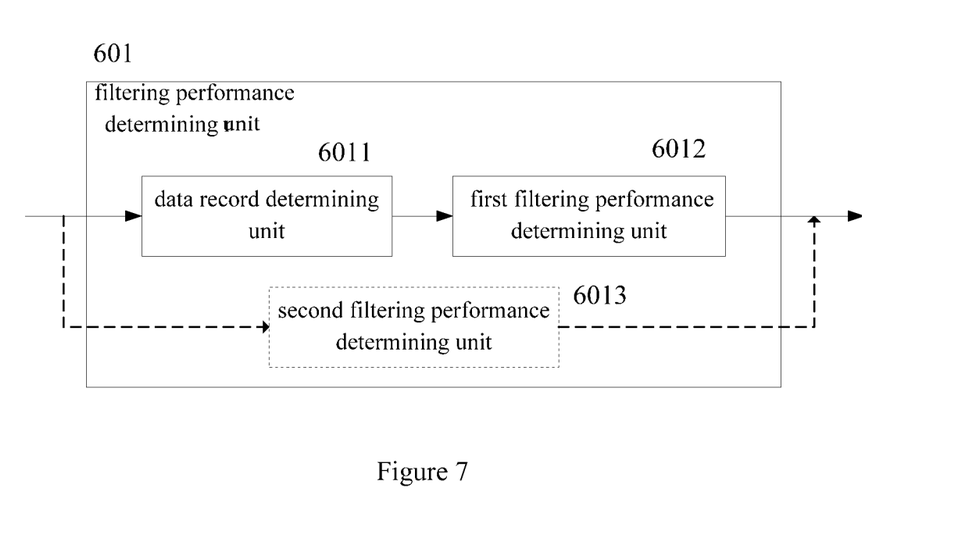
FIG. 7 illustrates a structural block diagram of a filtering performance determining unit in the optimizing apparatus for the query statement in the relational database according to an embodiment of the present disclosure.

FIG. 7 shows a structural block diagram of the filtering performance determining unit 601. As shown in FIG. 7, the filtering performance determining unit 601 may include a data record determining unit 6011 and a first filtering performance determining unit 6012.

For each of the at least two complex predicates, the data record determining unit 6011 determines the sequence numbers of the data records resulted from the query performed on the data records by using only the complex predicate. The first filtering performance determining unit 6012 creates a N-variable row vector corresponding to the complex predicate based on the sequence numbers of the data records retrieved by the data record determining unit 6011, where N is the number of the predetermined data records (all the data records). In this row vector, the elements at the positions corresponding to the sequence numbers of the retrieved data records are of a value 1, and the elements at other positions are of a value 0. Therefore, it can be easily determined which of the records can be filtered out by the corresponding predicate based on the values of the elements in the N-variable row vector.

The re-ordering unit 602 may include an element number determining unit 6021 and an order adjusting unit 6022. The element number determining unit 6021 determines the number of the elements having the value of 1 for respective N-variable row vectors. The order adjusting unit 6022 performs the re-ordering on the predicates in the predetermined layer based on the number of the elements having the value of 1 in respective N-variable row vectors in accordance with the predicate conjunctions between the complex predicates in the predetermined layer. It can be understood that the less elements have the value of 1 in a N-variable row vector, the less data records is filtered out of all the data records by the predicate corresponding to this N-variable row vector, whereas the more elements have the value of 1 in a N-variable row vector, the more data records is filtered out of all the data records by the predicate corresponding to this N-variable row vector. As described before, in the case that the predicate conjunction is AND, as for the two predicates joined by this conjunction, the one for which less data records can be filtered out when running the query statement should be arranged ahead to reduce the number of the data records to be processed by the behind predicates, thereby reducing the overall estimations and checks for the predicates; and in the case that the predicate conjunction is OR, the predicate for which more data records can be filtered out when running the query statement should be arranged ahead. Accordingly, the order adjusting unit 6022 ranks the complex predicate corresponding to the N-variable row vector with less elements having the value of 1 before the complex predicate corresponding to the N-variable row vector with more elements having the value of 1 in the case that the predicate conjunction is AND, and ranks the complex predicate corresponding to the N-variable row vector with more elements having the value of 1 before the complex predicate corresponding to the N-variable row vector with less elements having the value of 1 in the case that the predicate conjunction is OR.

The structure and function of the optimizing apparatus 600 according to the embodiment of the present disclosure have been described above, by taking the predicates in the predetermined layer of the query statement being re-ordered as an example. In practice, the predicates in a plurality of layers of the query statement can be re-ordered by applying the optimizing apparatus 600 to the plurality of layers, respectively. It is to be noted, after the complex predicates in the predetermined layer of the query statement have been re-ordered by the optimizing apparatus 600, the filtering performance for a compound predicate consisting of the predicates in this layer and the predicate conjunction joining said predicates needs to be determined, because the compound predicate may still be involved in the subsequent re-ordering. In this case, optionally, the filtering performance determining unit 601 may further include a second filtering performance determining unit 6013, for determining the filtering performance of the compound predicate consisting of the predicates in the predetermined layer and the predicate conjunction joining them and passing this filtering performance to the re-ordering unit 602. In specific, with respect to the respective N-variable row vectors corresponding to the respective predicates in the predetermined layer, the second filtering performance determining unit 6013 performs a logical operation represented by the predicate conjunction on the elements on the corresponding positions, one element by one element, so as to obtain an intermediate N-variable row vector for representing the filtering performance of the compound predicate. It is to be noted that the second filtering performance determining unit 6013 performs logical operation represented by the predicate conjunction on all the N-variable row vectors of all the predicates in the predetermined layer rather than just on those predicates the ranks of which have been adjusted actually.

As described before, the re-ordering unit 602 described above performs the re-ordering only on the predicates which the user concerns and does not care the order of the simple predicates. Therefore, the simple predicates are not taken into account in re-ordering the complex predicates, that is, not involved in the re-ordering process. In fact, however, the presence of the simple predicates may affect the re-ordering of the complex predicates. The reason has been explained in the above second embodiment and the repetition thereof is omitted herein.

In view of this, the simple predicates will be considered in re-ordering the complex predicates to obtain a more precise order. To be more specific, in the case that there is at least one simple predicate in the predetermined layer, the element data determining unit 6021 may eliminate the effect on the filtering performance of the complex predicates by the simple predicates. In particular, for each N-variable row vector corresponding to the complex predicate, the number of the elements in this row vector which have the value of 1 besides the elements at the positions corresponding to the elements having the value of 0 in the N-variable row vector corresponding to the simple predicate is determined as the number of the elements having the value of 1 in this N-variable row vector, when the predicate conjunction is AND; and the number of the elements in this row vector which have the value of 1 besides the elements at the positions corresponding to the elements having the value of 1 in the N-variable row vector corresponding to the simple predicate is determined as the number of the elements having the value of 1 in this N-variable row vector, when the predicate conjunction is OR. The order adjusting unit 6022 performs the re-ordering on the predicates based on the number of elements thus determined The filtering performance determining unit 601 and the re-ordering unit 602 will be described in detail below, where the filtering performance of the predicates is represented, for example, by the filter factor calculated by using the actual result of the query.

In this case, the filtering performance determining unit 601 may also include a data record determining unit 6011 and a first filtering performance determining unit 6012.

For each of the at least two complex predicates, the data record determining unit 6011 determines the number of the data records resulted from the query performed on the data records by using only the complex predicate. The first filtering performance determining unit 6012 determines the filter factors corresponding to the respective predicates based on the number of the data records in the manner described above, details omitted here.

The re-ordering unit 602 performs the re-ordering on the complex predicates in the predetermined layer based on the filter factors so as to make the complex predicate with higher filtering performance is ranked before that with lower filtering performance. In specific, as described before, in order to reduce the overall estimation and check for the predicates to improve the execution efficiency of the query, the re-ordering unit 602 ranks the complex predicate with the filter factor of a smaller value before the complex predicate with the filter factor of a larger value in the case that the predicate conjunction in the predetermined layer is AND, and ranks the complex predicate with the filter factor of a larger value before the complex predicate with the filter factor of a smaller value in the case that the predicate conjunction in the predetermined layer is OR.

As mentioned hereinbefore, the optimizing apparatus 600 according to the embodiment of the present disclosure can also perform the re-ordering on the predicates in a plurality of layers. It is to be noted that after the complex predicates in the predetermined layer of the query statement have been re-ordered by the optimizing apparatus 600, the filtering performance for a compound predicate consisting of the predicates in this layer and the predicate conjunction joining said predicates needs to be determined, because the compound predicate may still be involved in the subsequent re-ordering. In this case, optionally, the filtering performance determining unit 601 may further include a second filtering performance determining unit 6013, for determining the filtering performance of the compound predicate consisting of the predicates in this layer and the predicate conjunction joining them and passing this filtering performance to the re-ordering unit 602. Herein, the filtering performance for the compound predicate is determined by using a conventional method in the art. In specific, the second filtering performance determining unit 6013 multiplies the filter factors of the respective predicates in the predetermined layer with each other in the case that the predicate conjunction is AND, and uses the product as the filter factor for the compound predicate; and adds the filter factors of the respective predicates in the predetermined layer together in the case that the predicate conjunction is OR, and uses the sum thereof as the filter factor for the compound predicate.

It is to be noted that the second filtering performance determining unit 6013 performs the multiplying or adding operation on the filter factors of all the predicates in the predetermined layer rather than on only the filter factors of predicates the rank of which have been adjusted actually.

The method and apparatus according to the embodiments of the present disclosure described above determine the filtering performance of a predicate from the actual result of the query performed on the data records to be queried by using only the predicate and thus the filtering performance is highly precise. Accordingly, the re-ordering performed based on this filtering performance has taken the actual data into account and thus is reliable and precise, so that high execution efficiency can be obtained when the query statement is executed.

In addition, the method and apparatus according to the embodiments of the present disclosure described above determine the filtering performance of a predicate from the actual result of the query performed on the data records to be queried by using only the predicate, which applies not only to the simple predicate, but also to the complex predicate. Consequently, the method and apparatus according to the embodiments of the present disclosure described above can be applied to the query comprising both the simple predicate and the complex predicate, and thus has a relatively broad applicable scope.

Furthermore, the method and apparatus according to the embodiments of the present disclosure described above eliminate the effect on the filtering performance of the complex predicates by the simple predicates when re-ordering the complex predicates based on the filtering performance, so that a more precise rank can be obtained and thus high execution efficiency can be obtained when the query statement is executed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optimizing method for a query statement in a relational database, comprising:
   determining a filtering performance for each of at least two complex predicates in a predetermined layer in a set of predetermined layers of the query statement based on a result of a query performed on predetermined data records by using only the at least two complex predicates in the predetermined layer;
   re-ordering the complex predicates in the predetermined layer based on the filtering performance so as to rank a complex predicate with higher filtering performance before a complex predicate with a lower filtering performance, wherein said re-ordering the complex predicates in the predetermined layer comprises:
      determining a number of elements having the value of 1 for each N-variable row vector;
      re-ordering the complex predicates in the predetermined layer based on the number of the elements having the value of 1 in respective N-variable row vectors, according to the predicate conjunction between the complex predicates in the predetermined layer; and
   wherein the filtering performance is ranked based upon a predicate conjunction; and
   determining the filtering performance for a compound predicate comprising the respective predicates in the predetermined layer and conjunctions joining the respective predicates;
   wherein said determining filtering performance for each of the complex predicates comprises:
      determining sequence numbers of the data records obtained by performing a query using the complex predicate;
      creating a N-variable row vector corresponding to the complex predicate to represent the filtering performance of the complex predicate, wherein N is the number of the predetermined data records, elements in the row vector at positions corresponding to the sequence numbers of the data records obtained by performing the query have a value 1, and elements at other positions have a value 0;
      creating corresponding N-variable row vectors for respective predicates in the predetermined layer for which the filtering performance has not been determined; and
      performing logical operation represented by the predicate conjunction for the corresponding N-variable row vectors of the predicates in the predetermined layer one element by one element, so as to obtain an intermediate N-variable row vector representing the filtering performance of the compound predicate.

2. The optimizing method according to claim 1, wherein in the case that there is at least a simple predicate in the predetermined layer, said determining the number of elements having the value of 1 for each N-variable row vector comprises:
   creating a corresponding N-variable row vector for each of the simple predicates; determining, for each N-variable row vector corresponding to the complex predicate, a number of the elements in the row vector which have the value of 1 besides the elements at the positions corresponding to the elements which have the value of 0 in the N-variable row vector corresponding to the simple predicate, as the number of the elements having the value of 1 in this N-variable row vector, when the predicate conjunction is AND; and
   determining a number of the elements in this row vector which have the value of 1 besides the elements at the positions corresponding to the elements which have the value of 1 in the N-variable row vector corresponding to the simple predicate, as the number of the elements having the value of 1 in this N-variable row vector, when the predicate conjunction is OR.

3. The optimizing method according to claim 1, wherein said determining the filtering performance for each of the complex predicates comprises:
   determining a number of data records obtained by performing a query using only the complex predicate; and
   calculating a filter factor for the complex predicate based on the number of the data records obtained by performing the query.

4. The optimizing method according to claim 3, wherein said re-ordering the complex predicates in the predetermined layer comprises:
   re-ordering the complex predicates in the predetermined layer based on the filter factor, according to the predicate conjunction between the complex predicates in the predetermined layer, wherein the re-ordering the complex predicates is performed in at least one of manners of:
      the complex predicate with a filter factor of a smaller value is ranked before the complex predicate with a filter factor of a larger value, in the case that the predicate conjunction is AND; and
      the complex predicate with a filter factor of a larger value is ranked before the complex predicate with a filter factor of a smaller value, in the case that the predicate conjunction is OR.

5. The optimizing method according to claim 3, wherein said determining the filtering performance for each of the complex predicates comprises:
   calculating filter factors for respective predicates in the predetermined layer for which the filtering performance has not been determined, and
   determining the filtering performance of a compound predicate based on the filter factors for the respective predicates in the predetermined layer in at least one of manners of:
      multiplying the filter factors of the respective predicates in the predetermined layer with each other to obtain a product as the filter factor of the compound predicate, in the case that the predicate conjunction is AND; and adding the filter factors of the respective predicates in the predetermined layer together to obtain a sum as the filter factor of the compound predicate in the case that the predicate conjunction is OR.

6. An optimizing apparatus for a query statement in a relational database, the apparatus comprising:

a processor communicatively coupled to a memory, the processor configured to:

determine filtering performance for each of at least two complex predicates in a predetermined layer in a set of predetermined layers of the query statement based on a result of query performed on predetermined data records by using only the at least two complex predicates in the predetermined layer;

re-order the complex predicates in the predetermined layer based on the filtering performance so as to rank a complex predicate with higher filtering performance before a complex predicate with lower filtering performance, wherein the processor is further configured to:

determine a number of elements having the value of 1 for each N-variable row vector;

re-order the complex predicates in the predetermined layer based on the number of the elements having the value of 1 in respective N-variable row vectors, according to the predicate conjunction between the complex predicates in the predetermined layer; and wherein the filtering performance is ranked based upon a predicate conjunction;

determining the filtering performance for a compound predicate comprising the respective predicates in the predetermined layer and conjunctions joining the respective predicates;

wherein said determining filtering performance for each of the complex predicates comprises:

determining sequence numbers of the data records obtained by performing a query using the complex predicate;

creating a N-variable row vector corresponding to the complex predicate to represent the filtering performance of the complex predicate, wherein N is the number of the predetermined data records, elements in the row vector at positions corresponding to the sequence numbers of the data records obtained by performing the query have a value 1, and elements at other positions have a value 0;

creating corresponding N-variable row vectors for respective predicates in the predetermined layer for which the filtering performance has not been determined; and performing logical operation represented by the predicate conjunction for the corresponding N-variable row vectors of the predicates in the predetermined layer one element by one element, so as to obtain an intermediate N-variable row vector representing the filtering performance of the compound predicate.

7. The optimizing apparatus according to claim 6, wherein the processor is further configured to:

determine, for each of said at least two complex predicates, sequence numbers of the data records obtained by performing a query using the complex predicate; and create a N-variable row vector corresponding to the complex predicate to represent the filtering performance of the complex predicate for each of said at least two complex predicates, wherein N is the number of the predetermined data records, elements in the row vector at positions corresponding to the sequence numbers of the data records obtained by performing the query have a value 1, and elements at other positions have a value 0.

8. The optimizing apparatus according to claim 7, wherein the processor is further configured to:

determine the filtering performance for a compound predicate consisting of the respective predicates in the predetermined layer and conjunctions joining the predicates.

9. The optimizing apparatus according to claim 8, wherein the processor is further configured to:

perform logical operation represented by the predicate conjunction for the corresponding N-variable row vectors of the predicates in the predetermined layer one element by one element, so as to obtain an intermediate N-variable row vector for representing the filtering performance of the compound predicate.

10. The optimizing apparatus according to claim 8, wherein the processor is configured to determine the filtering performance of the compound predicates in at least one of manners of:

multiplying a filter factor of the respective predicates in the predetermined layer with each other to obtain a product as the filter factor of the compound predicate, in the case that the predicate conjunction is AND; and adding a filter factor of the respective predicates in the predetermined layer together to obtain a sum as the filter factor of the compound predicate in the case that the predicate conjunction is OR.

11. The optimizing apparatus according to claim 6, wherein in the case that there is at least a simple predicate in the predetermined layer, the processor is further configured to:

determine, for each N-variable row vector corresponding to the complex predicate, a number of the elements in the row vector which have the value of 1 besides the elements at a position corresponding to the elements which have the value of 0 in the N-variable row vector corresponding to the simple predicate, as the number of the elements having the value of 1 in this N-variable row vector, when the predicate conjunction is AND; and determine a number of the elements in this row vector which have the value of 1 besides the elements at a position corresponding to the elements which have the value of 1 in the N-variable row vector corresponding to the simple predicate, as the number of the elements having the value of 1 in this N-variable row vector when the predicate conjunction is OR.

12. The optimizing apparatus according to claim 6, wherein the processor is further configured to:

determine, for each of said at least two complex predicates, a number of data records obtained by performing a query using only the complex predicate; and calculate a filter factor for the complex predicates based on the number of the data records obtained by performing the query.

13. The optimizing apparatus according to claim 12, wherein the processor is configured to re-order the complex predicates in the predetermined layer based on the filter factor according to the predicate conjunction between the complex predicates in the predetermined layer, wherein the re-ordering the complex predicates is performed in at least one of manners of:

the complex predicate with a filter factor of a smaller value is ranked before the complex predicate with a filter factor of a larger value, in the case that the predicate conjunction is AND; and the complex predicate with a filter factor of a larger value is ranked before the complex predicate with a filter factor of a smaller value, in the case that the predicate conjunction is OR.

14. A computer program product for optimizing a query statement in a relational database, the computer program product comprising a non-transitory computer readable storage medium having program instructions embodied therewith, the program instructions executable by a processor to cause the processor to perform a method comprising:

determining filtering performance for each of at least two complex predicates in a predetermined layer in a set of predetermined layers of the query statement based on a result of a query performed on predetermined data records by using only the at least two complex predicates in the predetermined layer;

re-ordering the complex predicates in the predetermined layer based on the filtering performance so as to rank a complex predicate with higher filtering performance before a complex predicate with lower filtering performance, wherein said re-ordering the complex predicates in the predetermined layer comprises:

determining a number of elements having the value of 1 for each N-variable row vector;

re-ordering the complex predicates in the predetermined layer based on the number of the elements having the value of 1 in respective N-variable row vectors, according to the predicate conjunction between the complex predicates in the predetermined layer; and wherein the filtering performance is ranked based upon a predicate conjunction; determining the filtering performance for a compound predicate comprising the respective predicates in the predetermined layer and conjunctions joining the respective predicates;

wherein said determining filtering performance for each of the complex predicates comprises:

determining sequence numbers of the data records obtained by performing a query using the complex predicate;

creating a N-variable row vector corresponding to the complex predicate to represent the filtering performance of the complex predicate, wherein N is the number of the predetermined data records, elements in the row vector at positions corresponding to the sequence numbers of the data records obtained by performing the query have a value 1, and elements at other positions have a value 0;

creating corresponding N-variable row vectors for respective predicates in the predetermined layer for which the filtering performance has not been determined; and performing logical operation represented by the predicate conjunction for the corresponding N-variable row vectors of the predicates in the predetermined layer one element by one element, so as to obtain an intermediate N-variable row vector representing the filtering performance of the compound predicate.

15. The computer program product according to claim 14, wherein said determining the filtering performance for each of the complex predicates comprises:

determining a number of data records obtained by performing a query using only the complex predicate; and calculating a filter factor for the complex predicate based on the number of the data records obtained by performing the query.

* * * * *